Oct. 13, 1953          R. E. DIVETTE ET AL          2,655,050
                         ANTIBACKLASH GEARING
                         Filed July 26, 1952
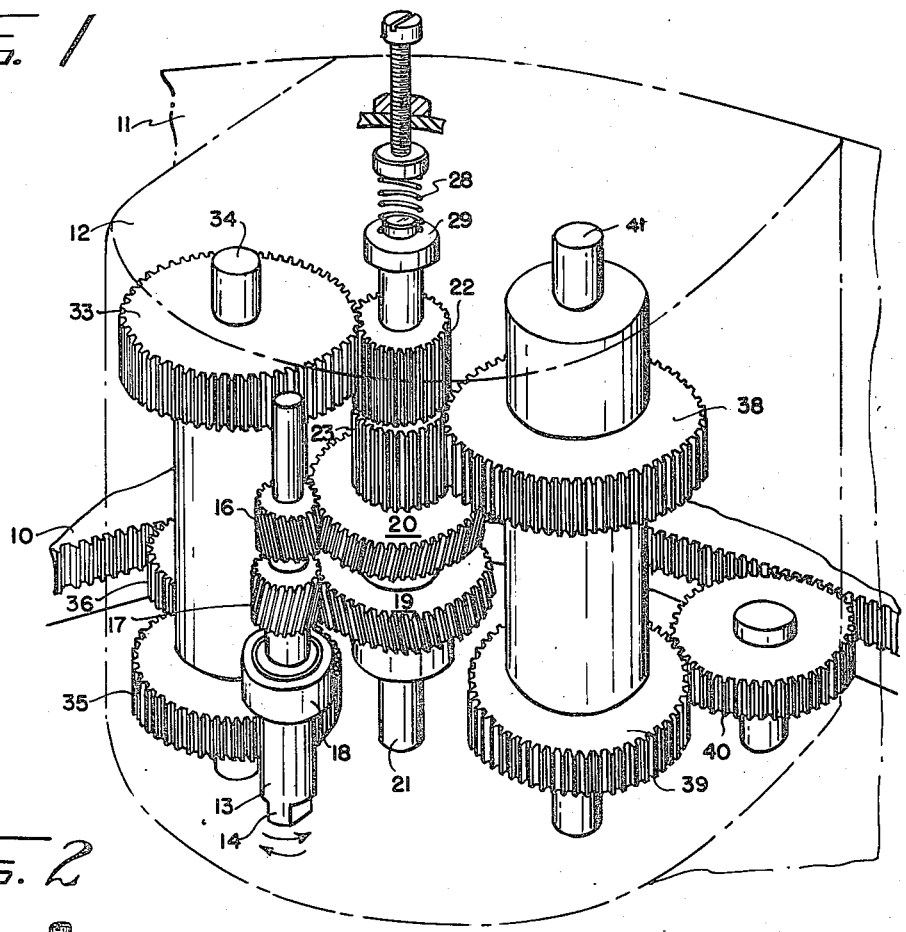
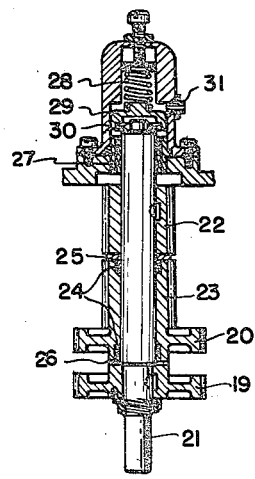
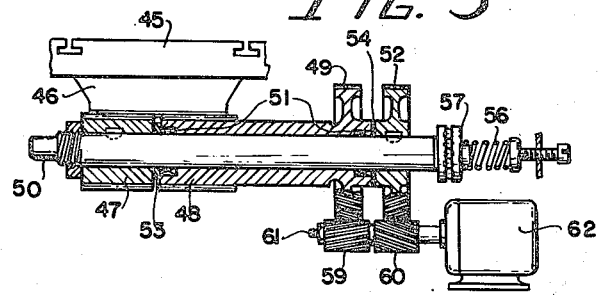
INVENTOR.
RANDOLPH E. DIVETTE
WILLIS H. GILLE
BY WILLIAM L. HUNTINGTON
George H Fisher
ATTORNEY Patented Oct. 13, 1953

2,655,050

UNITED STATES PATENT OFFICE 2,655,050

ANTIBACKLASH GEARING

Randolph E. Divette, Minneapolis, Willis H. Gille, St. Paul, and William L. Huntington, Minneapolis, Minn., assignors to Minneapolis-Honeywell Regulator Company, Minneapolis, Minn., a corporation of Delaware Application July 26, 1952, Serial No. 301,074

8 Claims. (Cl. 74—409)

The present invention relates to a simple and rugged anti-backlash gear train.

In gear trains for some machine tool devices, tank turret drives and for control mechanism of various sorts, it is very important that there be no backlash or lost motion in the drive. Prior art devices have been reasonably satisfactory with low power or low speeds but cannot meet the requirements of many drives now in use.

The present invention eliminates backlash by simultaneously driving through parallel gear trains, with the gear trains being biased apart so that the gears of each train are in constant engagement on their driving faces. This is accomplished by driving through two sets of helical gears, the gears being arranged so that their end thrust forces would normally balance each other, as in a herringbone gear set. However, one pair of the gears are relatively rotatable but axially fixed together so that, by an axial bias on this set of gears, opposite rotative forces are set up which maintain the aforementioned engagement. Further, because an axial bias is impressed on the helical gears, the biasing means need not rotate and therefore adds no inertia to the gear train. It is thus apparent that it is an object of this invention to provide an improved anti-backlash gear train.

It is a further object to provide a reversible gear train having parallel paths with each path including driving and driven helical gears and wherein an axial bias on either the driving or driven helical gears removes the lost motion from both paths of the drive.

These and other objects will become apparent upon a study of the following specification and drawings wherein:

Figure 1 is a schematic view of the present gear train arranged in a tank turret drive.

Figure 2 is a sectional elevation view of the first countershaft in the drive of Figure 1.

Figure 3 is a schematic view, with parts in section, showing an anti-backlash drive applied to a machine tool.

The diagrammatic showing of Figure 1 illustrates the application of the present invention to a tank turret drive. As is well known, a tank turret is driven in either direction and at widely varying speeds under the control of a gunner or the like and, because he aims his guns, so far as traverse is involved, by turning the turret, it is important that there be no backlash or lost motion in this drive. In Figure 1, circular rack 10 is attached to a tank, not shown, and surrounds the turret, shown partially in phantom by 11, gear box 12 being attached to the turret 11. In gear box 12, a drive shaft 13 is driven by a suitable hydraulic or electric motor, not shown, through tongue 14. Shaft 13 carries and has fixedly attached thereto, a pair of helical pinion gears 16 and 17, these gears having oppositely inclined teeth so that the assembly resembles a herringbone gear. Thrust is taken by a suitable bearing 18, with other bearings, not shown, also being provided.

Pinions 16 and 17 mesh with a pair of helical gears 19 and 20 carried by a countershaft 21, this assembly being shown in section in Figure 2. As best shown in this latter figure, gear 19 is keyed to shaft 21 as is a spur gear pinion 22. Gear 20 is made integrally with a spur gear pinion 23, similar to pinion 22, and these gears are rotatably mounted on shaft 21 by bearings 24, thrust washers 25 and 26, however, fixing these gears against axial movement on the shaft. Shaft 21 is rotatably guided by a bearing such as 27 and is urged downwardly, as shown in Figures 1 and 2, by its own weight and by a spring 28 engaging a thrust bearing and piston-like guide member 29. As shown in Figure 2 member 29 is guided by a cylinder 30 having, if desired, a fitting 31 so that hydraulic pressure can be applied above 29 to thereby exert a greater axial bias on shaft 21.

Pinion 22 meshes with gear 33 on countershaft 24, which also includes gear 35, both of these gears being connected in fixed relation to each other. Gear 35 drives an idler gear 36 which meshes with rack 10 so that one drive path or train from pinion 16—17 includes gears 19, 22, 33, 35, 36 and the rack 10. A similar and parallel drive path from the pinions is through gears 20, 23, 38, 39, idler 40 and the rack 10, gears 38 and 39 being held in fixed relation by countershaft 41. Shafts 34 and 41, as well as the shafts for the idler gears 36 and 40, are of course, guided by suitable bearings, not shown, in the gear box 12.

If it now be assumed that drive shaft 13 is stationary, the downward thrust on shaft 21 and its gears tends to cause rotation of gear 19 to the right and rotation of gear 20 to the left. The tendency for gear 19 to rotate to the right results in the idler gear 36 tending to rotate to the right and thereby drive the gear box 12 to the right. Likewise, tendency of gear 20 to rotate to the left results in idler 40 tending to rotate to the left and to drive the gear box 12 to the left. Obviously, with these parallel gear trains working against each other, rotation can take place only to the extent that lost motion or backlash is taken up so that there is no actual driving of the turret but the teeth of both drive paths are in firm driving relation. Obviously, the axial thrust on shaft 21 is taken through the meshing gears to bearing 18 on shaft 13. Thus, upon energization of the drive motor, not shown, the drive will be through gear teeth already in firm driving relation regardless of the direction of rotation of the drive motor. In addition, because the biasing means does not rotate, it adds no momentum to the drive. Further, because the rotative bias is a transverse vector of the axial thrust, the axial bias exerted against shaft 21 can be relatively light. While the arrangement shown is preferred, it is obvious that it is unimportant whether the axial bias be on shaft 13 or 21 so long as one is biased relative to the other and the shaft without the direct thrust has a thrust bearing.

The present anti-backlash arrangement is readily adaptable to other uses than that described, with Figure 3 showing an adaptation to the table of a machine tool, such as a milling machine. In this figure, table 45 is driven by a longitudinal rack 46 on its under side, rack 46 being driven by spur gears 47 and 48, gear 48 being, preferably, integral with helical gear 49, these gears being mounted on shaft 50 by bearings 51. Gear 47 is keyed to shaft 50 as is helical gear 52, and thrust washers 53 and 54 axially restrain gears 48 and 49. Shaft 50 is biased to the left by spring 56 operating through a thrust bearing 57. As is apparent, shaft 50 and its attached gears is similar to 21 and its gears. Helical gears 49 and 52 are driven by helical pinion gears 59 and 60 firmly attached to the output shaft 61 of geared motor 62, shaft 61 being guided by suitable bearings, including a thrust bearing, not shown. Gears 59 and 60 have oppositely inclined teeth and, like pinions 16 and 17, they resemble a herringbone gear. As a matter of fact, they may be replaced by a suitable herringbone gear without the least change in operation of the apparatus. Assuming motor 62 is not operating, it will be noted that the axial thrust on shaft 50 tends to rotate gears 49 and 48 in a direction to drive rack 46 and table 45 backwards whereas the same thrust tends to cause gears 52 and 47 to drive the rack and table in a forward direction. As a result, gears 47 and 48 pinch the rack teeth from opposite sides and provide a firm driving relation without backlash regardless of the direction of operation of motor 62. As in the previous example, the same substitutions and equivalents are available and it is apparent various other alternatives may be used following the teachings of this invention. As many substitutions and equivalents are permissible, the scope of this invention should be determined only by the appended claims.

We claim:

1. In a gear drive, gear means having two sets of oppositely inclined teeth in fixed relation to each other and similar to a herringbone gear, a pair of helical gears in engagement with said gear means, said helical gears being relatively rotatable but axially fixed relative to each other, means biasing said helical gears in an axial direction, a spur gear attached to one of said helical gears, another spur gear attached to the other helical gear, and means arranged to be driven by said spur gears.

2. In a gear drive, a first gear assembly comprising gear means having two sets of oppositely inclined teeth in fixed relation to each other and similar to a herringbone gear, a second gear assembly comprising a pair of helical gears each of which is in engagement with a set of teeth of said gear means, said helical gears being rotatable relative to each other but axially fixed together, means axially biasing one of said assemblies relative to each other, and means arranged to be driven by said helical gears.

3. In a gear drive for a machine, a first gear assembly comprising gear means having two sets of oppositely inclined teeth in fixed relation to each other and similar to a herringbone gear, a second gear assembly comprising a pair of helical gears each of which is in engagement with a set of teeth of said gear means, said helical gears being rotatable relative to each other but axially fixed together, means axially biasing one of said assemblies relative to the other, separate spur gear means attached to each of said helical gears, and unitary spur gear means arranged to be driven by both of said separate spur gear means.

4. A gear train comprising a driving pair of helical gears having opposite teeth angles, a driven pair of helical gears mating with the driving helical gears, one of said pairs of gears being arranged in positive fixed relation to each other, the other pair of said gears being relatively rotatable but held in fixed axial relation to each other, means for exerting an axial bias on one of said pairs of gears, and means arranged to be driven by the driven gears.

5. In a gear drive, a pair of helical gears fixed to a shaft, said gears having opposite tooth angles, a second pair of helical gears in engagement with the first named gears, said second pair of gears being relatively rotatable but held in fixed axial relation to each other, means for exerting an axial bias on said second pair of gears, and means arranged to be driven by one or the other of a second pair of gears.

6. In a gear drive, a pair of aligned helical gears in fixed relation to each other, said gears having oppositely inclined teeth and resembling a herringbone gear, a second pair of helical gears in mating relation with the first named gears, the second pair of gears being in fixed axial relation to each other but being relatively rotatable, means arranged to be driven in one direction by one of said second pair of gears and in an opposite direction by the other of said second pair of gears, and means exerting a bias along the axis of said second pair of gears to thereby create a rotative bias forcing the driving faces of the gears of the drive in firm engagement regardless of the direction of the drive.

7. In a reversible gear drive for a machine, a first assembly comprising gear means having two sets of oppositely inclined teeth in fixed relation to each other and similar to a herringbone gear, a second assembly comprising a pair of helical gears each of which is in engagement with a set of teeth of said gear means, said helical gears being rotatable relative to each other but axially fixed together, biasing means exerting a force axially against one of said assemblies tending to shift one assembly axially relative to the other and, because of the slopes of the gear teeth, exerting a rotative bias, driven means, and means separately connecting each of said helical gears to said driven means.

8. In a reversible gear drive for a machine, a first assembly comprising gear means having two sets of oppositely inclined teeth in fixed relation to each other and similar to a herringbone gear, a second assembly comprising a pair of helical gears each of which is in engagement with a set of teeth of said gear means, said helical gears being rotatable relative to each other but axially fixed together, means biasing one of said assemblies axially relative to the other, an intermediate gear means attached to one of said helical gears, another intermediate gear means attached to the other helical gear, and tooth means arranged to be driven by both of said intermediate gear means.

RANDOLPH E. DIVETTE.
WILLIS H. GILLE.
WILLIAM L. HUNTINGTON.

No references cited.